United States Patent [19]

Amjad et al.

[11] Patent Number: 4,885,097

[45] Date of Patent: Dec. 5, 1989

[54] STABILIZATION OF METAL IONS WITH TERPOLYMERS CONTAINING STYRENE SULFONIC ACID

[75] Inventors: Zahid Amjad, Avon Lake; William F. Masler, Hinckley, both of Ohio

[73] Assignee: The B. F. Goodrich Company, Akron, Ohio

[21] Appl. No.: 235,268

[22] Filed: Aug. 23, 1988

Related U.S. Application Data

[63] Continuation-in-part of Ser. No. 938,896, Dec. 8, 1986.

[51] Int. Cl.$^4$ ................................................ C02F 5/12
[52] U.S. Cl. ..................................... 210/701; 252/180
[58] Field of Search ............................... 210/698–701; 252/180, 181

[56] References Cited

U.S. PATENT DOCUMENTS

| | | | |
|---|---|---|---|
| 3,682,224 | 8/1972 | Bleyle | 210/701 |
| 3,709,815 | 1/1973 | Boothe et al. | 210/701 |
| 3,709,816 | 1/1973 | Walker et al. | 210/701 |
| 3,790,610 | 2/1974 | Lum et al. | 210/701 |
| 3,806,367 | 4/1974 | Lange et al. | 210/701 |
| 3,898,037 | 8/1975 | Lange et al. | 210/701 |
| 3,928,196 | 12/1975 | Persinski et al. | 210/701 |
| 4,425,326 | 1/1984 | Guillon et al. | 424/61 |
| 4,500,693 | 2/1985 | Takehara et al. | 210/701 |
| 4,532,048 | 7/1985 | Amjad et al. | 210/701 |
| 4,536,292 | 8/1985 | Matz | 210/701 |
| 4,552,665 | 11/1985 | Ralston et al. | 252/180 |
| 4,560,481 | 12/1985 | Hollander | 252/180 |
| 4,566,973 | 1/1986 | Masler | 210/701 |
| 4,575,425 | 3/1986 | Boffardi et al. | 210/697 |
| 4,589,985 | 5/1986 | Yorke | 210/699 |
| 4,596,661 | 6/1986 | Gill et al. | 210/728 |
| 4,618,448 | 10/1986 | Cha et al. | 210/701 |
| 4,634,532 | 1/1987 | Logan et al. | 210/697 |
| 4,640,793 | 2/1987 | Persinski et al. | 252/180 |
| 4,711,725 | 12/1987 | Amick et al. | 210/701 |
| 4,784,774 | 11/1988 | Amjad et al. | 210/701 |

FOREIGN PATENT DOCUMENTS

| | | | |
|---|---|---|---|
| WO/8302607 | 8/1983 | Pct Int'l Appl. | 210/701 |
| 2082600 | 3/1982 | United Kingdom | 210/701 |

*Primary Examiner*—Peter Hruskoci
*Attorney, Agent, or Firm*—Nestor W. Shust; George A. Kap

[57] ABSTRACT

Stabilization of metal ions in an aqueous medium is obtained by adding to said aqueous medium 0.5 to 500 ppm of a copolymer containing at least one of each of the following three monomers:

(a) acrylic acid, methacrylic acid, and mixtures thereof;
(b) acrylamidoalkane sulfonic acids and salts thereof, such as 2-acrylamido-2-methylpropane sulfonic acid; and
(c) primary copolymerizable monomers selected from styrene sulfonates.

22 Claims, No Drawings

STABILIZATION OF METAL IONS WITH TERPOLYMERS CONTAINING STYRENE SULFONIC ACID

REFERENCE TO RELATED APPLICATION

This is continuation-in-part of application Ser. No. 938,896 filed Dec. 8, 1986 now abandoned and entitled "Stabilization of Metal Ions With Copolymers Containing Acrylamidoalkane Sulfonic Acid."

BACKGROUND OF THE INVENTION

Citric acid, gluconic acid, ascorbic acid, tartaric acid, certain phosphonates, and other chelant materials have been used in the past to stabilize iron in solution and thus prevent its precipitation in forms such as ferric hydroxide and ferric oxide, wherein iron is in the second or third oxidation state. Citric acid and such prior art chelants effectively maintain iron in solution by forming complexes therewith which are soluble in water and thereby, remain dissolved in water. Although citric acid and cognate chelants are effective as solubilizing agents for iron in solution, they are not antiscalants and are ineffective against scale such as calcium carbonate, calcium phosphate, calcium sulfate, magnesium hydroxide, and the like.

Furthermore, performance of the prior art chelants is strongly dependent on solution pH. For example, iron (III) stabilization at 2 ppm of citric acid was 79% at pH of 7 but only 2% at pH of 8. In other words, an increase in solution pH from 7 to 8 decreased citric acid performance approximately forty times.

U.S. Pat. No. 4,552,665 discloses a process for stabilizing dissolved manganese ion and its reaction products in an aqueous solution by adding thereto 0.1 to 20 ppm of a copolymer of an unsaturated carboxylic acid or its salt and an unsaturated sulfonic acid or its salt. Acrylic acid is an example of the unsaturated carboxylic acid and 2-acrylamido-2-methylpropane sulfonic acid (AMPS) is an example of the unsaturated sulfonic acid. The disclosed copolymers include 3-component copolymers or terpolymers.

The Amick U.S. Pat. No. 4,711,725 discloses stabilization of an aqueous system by inhibiting precipitation of calcium phosphate with a copolymer antiscalant, said copolymer comprising 42 to 84% of (meth)acrylic acid and salts thereof, 11 to 40% acrylamido alkane, sulfonic acid, and 5 to 30% or one or more monomers selected from vinyl esters, vinyl acetate, and substituted acrylamide. The aqueous medium can contain or can be devoid of iron contamination.

Other cases are being filed concurrently for Messrs. Amjad and Masler which relate to the use of same or similar polymers. One of the other cases is entitled "Scale Control with Copolymers Containing Acrylamidoalkane Sulfonic Acid," and the other case is entitled "Terpolymers for Dispersing Particulates In An Aqueous Medium".

SUMMARY OF THE INVENTION

This invention is directed to stabilization of metal ions in an aqueous medium by addition thereto of at least an effective amount of a copolymer which contains at least three different repeating groups for stabilization of soluble metal ions, particularly iron, zinc, and manganese, and especially iron in the (II) and (III) oxidation states. Such copolymers contain at least three different repeating units selected from polymerized monounsaturated carboxylic acids of 3 to 5 carbons and water-soluble salts and anhydrides thereof, acrylamidoalkane sulfonic acids and salts thereof, and primary comonomers selected from styrene sulfonic acids, their salts, and mixtures thereof.

DETAILED DESCRIPTION OF THE INVENTION

Copolymers are described herein which are effective in stabilizing transition metal ions, such as iron, zinc and manganese. Amount of such copolymer that is added to an aqueous medium is at least an effective amount which is in the range of 0.5 to 500 parts per million (ppm) of the aqueous medium, preferably 1 to 50 ppm. Although the aqueous medium can be acidic, in a preferred embodiment it is neutral or alkaline.

Specific applications contemplated herein where the copolymers can be used include aqueous systems used in recirculating cooling towers, steam boilers, desalination, oil field applications in secondary oil recovery operations, flash distillation, as well as in aqueous systems such as sugar solutions.

The copolymers can be in unneutralized or neutralized form. Such copolymers can be neutralized with a strong alkali, such as sodium hydroxide, in which instance, the hydrogen of the carboxyl group and sulfonic acid group in the copolymer will be replaced with sodium. With the use of an amine neutralizing agent, the hydrogen will be replaced with an ammonium group. Useful copolymers for purposes herein include copolymers that are unneutralized, partially neutralized, and completely neutralized.

The copolymers are soluble in water up to about 20% solids concentration, and they must, of course, be soluble in water in amount used, to be effective metal ion stabilizers. The copolymers contemplated herein are polymers of at least three different monomers and include at least one monomer selected from each one of the groups (a), (b) and (c) The groups (a), (b) and (c) are defined as follows:

(a) monounsaturated carboxylic acids of 3 to 5 carbon atoms, salts and anhydrides thereof;

(b) acrylamidoalkane sulfonic acids and salts thereof containing up to 6, preferably 1 to 4, carbon atoms in the alkane moiety; and (c) primary copolymerizable monomers which aid in the stabilizing effectiveness of the copolymers selected from styrene sulfonic acids, their salts, and mixtures thereof.

In addition to the above requisite monomers, a small amount of other or secondary copolymerizable monomers can also be used as long as they do not substantially deleteriously affect performance of the copolymers as metal ion stabilizers. Amount of such secondary copolymerizable monomers can generally vary up to about 20% by weight, preferably 2 to 10% by weight of the final copolymer.

The copolymers suitable herein are random non-crosslinked polymers containing polymerized units of one or more of each of the monomers (a), (b), and (c), identified above, and can contain a small proportion of polymerized units of one or more of the secondary copolymerizable monomers. The copolymers have weight average molecular weight of 1,000 to 100,000, preferably 2,000 to 50,000, and more preferably 2,000 to 20,000. The molecular weight given herein is measured by gel permeation chromatography.

The copolymers contain 20 to 95% by weight of the Polymerized carboxylic acid or its salt or anhydride, preferably 30 to 75% and more preferably 30 to 60%; 1 to 60% by weight of the polymerized acrylamidoalkane sulfonic acid or its salt, preferably 10 to 50% and more preferably 20 to 50%; 5 to 30% of the primary copolymerizable monomer, and preferably about 10 to 20%. The copolymers can also include one or more polymerizable, secondary comonomers in amount of up to about 20%, preferably up to about 10%, and more preferably about 2 to 10%, which exclude substituted acrylamides, vinyl esters, and acrylate esters.

The carboxylic acid monomers contemplated herein include monounsaturated monocarboxylic and dicarboxylic acids, salts and anhydrides thereof. Preferred in this class are monounsaturated monocarboxylic acids of 3 to 4 carbon atoms and water soluble salts thereof, particularly acrylic acid and methacrylic acid. Because of its availability, effectiveness and low price, acrylic acid is particularly preferred. Repeating units of an acrylic acid and salts thereof are represented as follows:

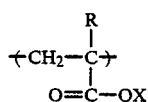

where R is hydrogen or methyl and X can be hydrogen, alkali metal, alkaline earth metal, or ammonium, particularly hydrogen, sodium, potassium, calcium, ammonium, and magnesium.

The repeating units of acrylamidoalkane sulfonic acids and salts thereof are defined as follows:

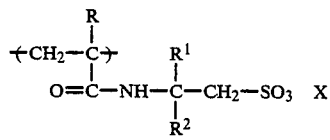

where R is hydrogen or methyl; is hydrogen, alkali metal or an alkaline earth metal, particularly hydrogen, ammonium or an alkali metal; and $R^1$ and $R^2$ are individually selected from hydrogen and alkyl groups of 1 to 4 carbon atoms. In a preferred embodiment, R is hydrogen and $R^1$ and $R^2$ are each an alkyl group of 1 to 3 carbon atoms. In this group of sulfonic acids, 2-acrylamido-2-methylpropane sulfonic acid or AMPS ® is a commercial, readily available monomer which is especially preferred for the stabilization effectiveness described herein. The primary copolymerizable monomers are selected from styrene sulfonic acids, their salts, and mixtures thereof. Repeating units of styrene sulfonic acids and salts thereof are defined as follows:

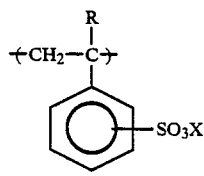

where R is hydrogen or a lower alkyl group of 1 to 6 carbon atoms preferably hydrogen, and X is hydrogen, alkali metal, alkaline earth metal, or ammonium, particularly hydrogen, ammonium or alkali metal. A particularly suitable sulfonic acid is styrene sulfonic acid where R is hydrogen and the —$SO_3X$ group is at the 3 or 4 position on the phenyl ring or a mixture thereof. The salts of styrene sulfonic acids are water-soluble. The sodium salt of styrene sulfonic acid is available commercially.

The monomers can be prepared, if desired, in a conventional manner but they are commercially available and therefore, can be purchased. Polymerization of the monomers results in an essentially non-crosslinked random copolymer, the molecular weight of which can be adjusted with a little trial and error. The copolymer is preferably formed in a high yield ranging from about 50% to about 99% by weight of the comonomers.

It is also a requirement that the copolymer be soluble in water. Typically, the copolymer is used in water in the range of 0.5 to 500 ppm. Thus, high solubility of water treatment compositions is not essential but desirable. The produce is preferably shipped in drums as a concentrated aqueous solution containing in the range of about 20% to about 50% by weight of solids per 100 parts of solution, which requires solubility to the extent of at least 20 weight parts per 100 parts of water.

Polymerization of the monomers identified herein can be carried out in a mutual solvent for both, such as in a lower alkanol of about 1 to 6 carbon atoms, or in water, with an effective amount of a free radical initiator sufficient to produce the desired composition within an acceptable period of time. The monomeric acids can be used as such or can be in a partially or a completely neutralized from prior to polymerization.

The reaction is conveniently carried out in water as the only reaction medium at a temperature in the range of about 30° to about 130° usually at atmospheric pressure.

The copolymer may also be formed in an acyclic ketone, such as acetone, in an alkanol, in water, or mixtures thereof. If, for example, the copolymer is formed in an organic solvent, or a mixture of an organic solvent and water, the copolymer is converted from the organic solvent solution to a water solution. Typically, the organic solvent is stripped from the solution with steam or distilled off with subsequent additions of water and repetition of distillation to remove the solvent, followed by the addition of water and a neutralizing agent such as caustic solution, ammonia, a hydrazine, or a low-boiling primary, secondary or tertiary aliphatic amine.

The final aqueous solution of polymer salt is preferably in the range of about pH 2 to about pH 8, with a total solids content of about 5 to about 50% by weight of polymer in water.

The copolymers formed may have weight average molecular weight in the range of about 1,000 to about 100,000, preferably 2,000 to 50,000, and more preferably about 2,000 to 20,000, as determined by gel permeation chromatography.

In a typical polymerization process, a glass lined or stainless steel jacketed reactor is charged with predetermined amounts of monomers along with solvent and the polymerization catalyst under a nitrogen blanket, and the reaction mixture allowed to exotherm under controlled temperature conditions maintained by a heat-transfer fluid in the jacket of the reactor. The pressure under which the reaction occurs is not critical, it being convenient to carry it out under atmospheric pressure.

The copolymers described herein in connection with stabilizing metal ions in solution, can be used in combination with other conventional additives wherever appropriate. Examples of some of the conventional additions include anti-precipitating agents, oxygen scavengers, sequestering agents, corrosion inhibitors, antifoaming agents, and the like.

EXAMPLE 1

This example demonstrates effectiveness of the AA/AMPS/SSS polymers as calcium phosphate scale inhibitors in presence or absence of iron. Pursuant to the procedure set forth herein, the copolymers formed in the manner described herein were used to treat water which contained calcium ions and phosphate ions in a stirred pH-STAT test while maintaining constant pH and using an automatic tritrator to gauge the effectiveness of the polymer for inhibiting the formation and deposition of calcium phosphate. The test was carried out as follows: a known volume of a phosphate salt solution, such as $Na_2HPO_4$, or another soluble phosphate salt solution, was transferred to a known volume of distilled water in a double-walled glass cell to give a final concentration of about 9 ppm of orthophosphate ions. To this solution was added slowly and with continuous stirring a known volume of testing polymer solution sufficient to give a dosage of 10 ppm.

A pair of glass and reference electrodes, which were calibrated before and after each experiment with standard buffer solutions of pH 7.00 and 9.00, were then immersed in the solution which was maintained at 50° C. by circulating water through the outside of a glass cell jacket. After about 45 minutes, a known volume of calcium chloride solution was slowly added to the continuously stirred solution containing phosphate and polymer, to give a final calcium ion concentration of 140 ppm. The pH of the solution was then immediately brought to pH 8.50 by automatic addition of 0.10M NaOH solution. The pH of the solution was then maintained at 8.50±0.01 throughout the experiment using the pH-stat technique. Solution samples were withdrawn after 22 hours, and analyzed, after filtration through 0.22 micrometer filter paper, for orthophosphate ions using the ascorbic acid method, as described in detail in "Standard Methods for the Examination of Water and Waste Water" 14th edition, prepared and published by American Health Association. The instrument used for the colorimetric measurements was a Beckman 5270 Spectrophotometer.

Tests for calcium sulfate were carried out by the method of Ralston, see J. Pet. Tech., August 1969, 1029–1036.

The percent threshold inhibition (TI) attained for each experiment was obtained using the following formula, shown in this case for calcium phosphate:

$$\% \, TI = \frac{(PO_4) \, exp - (PO_4) \, final}{(PO_4) \, initial - (PO_4) \, final} \times 100$$

where
($PO_4$) exp = concentration of phosphate ion in the filtrate in presence of the copolymer at time of 22 hours
($PO_4$) final = concentration of phosphate ion in filtrate in absence of the copolymer at time 22 hours
($PO_4$) initial = concentration of phosphate ion at time zero.

Scale inhibition results referred to above are set forth in Table I, below:

TABLE I

| Composition | Monomer Wt. Ratio | Mol. Wt. | % Ca/P[a] Inhibition |
|---|---|---|---|
| AA:AMPS:SSS | 70:10:20 | 5,000 | 81 |
| " | 70:10:20 | 15,000 | 77 |
| " | 60:10:30 | 5,000 | 93 |
| " | 60:10:30 | 10,000 | 95 |
| " | 60:10:30 | 15,000 | 89 |
| " | 60:30:10 | 5,000 | 92(72) |
| " | 60:30:10 | 15,000 | 99(79) |
| " | 60:30:10 | 29,000 | 94(67) |
| " | 60:30:10 | 33,000 | 86(71) |
| " | 60:32.5:7.5 | 15,000 | 97 |
| " | 50:30:20 | 5,000 | 92 |
| " | 50:30:20 | 10,000 | 95 |
| " | 50:30:20 | 15,000 | 96 |
| " | 50:30:20 | 30,000 | 95 |
| " | 40:30:30 | 5,000 | 66 |
| " | 40:30:30 | 10,000 | 87 |
| " | 40:30:30 | 15,000 | 95(85) |
| " | 40:50:10 | 15,000 | 83 |
| " | 50:30:20 | 60,000 | 86 |
| " | 50:40:10 | 50,000 | 95 |
| AA:AMPS:SSS:DADMAC | 60:25:10:5 | 15,000 | 74 |

[a]Conditions:
calcium = 140 ppm; phosphate = 9 ppm; pH = 8.50; T = 50° C.; time = 22 hr.; polymer = 10 ppm The following contractions appear in the above table:
Ca/P = calcium phosphate
AA = acrylic acid
AMPS ® = 2-acrylamido-2-methylpropane sulfonic acid
SSS = sodium styrene sulfonate
DADMAC = diallyldimethylammonium chloride The numbers in parentheses indicate percent threshold inhibition of calcium phosphate in the presence of 1.0 ppm of soluble iron (III).

It has been shown that copolymers disclosed herein are effective antiscalants in the presence or absence of soluble metal ions. Typical scales encompassed by the present invention include especially calcium scales such as calcium phosphate.

EXAMPLE 2

To determine effectiveness of the copolymers as metal ion stabilizers, a known amount of ferric chloride was added to 100 mls of synthetic water containing 0-5 ppm of the copolymers in a 125 ml glass bottle. The synthetic water used in the metal ion stabilization test was made by mixing standard solutions of calcium chloride, magnesium chloride, sodium bicarbonate, sodium sulfate and sodium chloride. Analysis of the water used in the tests, is given below:

| | |
|---|---|
| Ca = 300 ppm | Cl = 2,170 ppm |
| Mg = 300 ppm | $SO_4$ = 700 ppm |
| Na = 1113 ppm | $HCO_3$ = 97 ppm |
| Fe = 1 ppm | |

The test was run for 2 hours, at room temperature and under static conditions. The solutions were filtered through a 0.22 micron filter and the filtrate was analyzed for soluble metal ion by atomic absorption spectroscopy. Percent metal ion stabilization was calculated as follows, here shown for iron:

$$\% \, iron \, stabilization = \frac{iron \, (exp) - iron \, (e)}{iron \, (initial) - iron \, (e)} \times 100$$

where:

iron (exp) = concentration of iron in the presence of the copolymer at t=2 hours iron (e) = concentration of iron in the absence of the copolymer at t=2 hours iron (initial) = concentration of iron at t=0

The stabilization data is presented in Table II, below:

TABLE II

| Composition | Monomer Wt. | Mol. Wt. | % Fe Stabilization Fe = 3 ppm 4 ppm polymer | Fe = 1.0 ppm 2.0 ppm polymer |
|---|---|---|---|---|
| AA:AMPS:SSS | 70:10:20 | 5,000 | — | 91 |
| " | 60:10:30 | 5,000 | — | 93 |
| " | 60:10:30 | 15,000 | — | 93 |
| " | 40:30:30 | 5,000 | 88 | 100 |
| " | 60:30:10 | 5,000 | 21 | 85 |
| " | 60:30:10 | 14,000 | 55 | 97 |
| " | 60:30:10 | 16,000 | 58 | 97 |
| " | 60:32.5:7.5 | 15,000 | 42 | 85 |
| " | 50:30:20 | 5,000 | 50 | 93 |
| " | 50:30:20 | 10,000 | 62 | 99 |
| " | 50:30:20 | 15,000 | 51 | 95 |
| " | 50:30:20 | 30,000 | 8 | 98 |
| " | 50:30:20 | 60,000 | — | 88 |
| " | 40:30:30 | 5,000 | 85 | 99 |
| " | 40:30:30 | 10,000 | 91 | 98 |
| " | 40:30:30 | 15,000 | 83 | 99 |
| " | 40:50:10 | 15,000 | 91 | 99 |

The above terpolymers containing sodium styrene sulfonate are effective iron stabilizers in an aqueous medium defined above.

We claim:

1. A method for maintaining metal ions in solution in an aqueous medium comprising adding to said aqueous medium an effective amount of a water-soluble copolymer for the purpose of maintaining said metal ions in solution, said copolymer consisting essentially of (a) 40-70% by weight carboxylic monomer selected from acrylic acid, methacrylic acid, salts of such acids, and mixtures thereof, (b) 10 to 50% by weight of a sulfonic monomer selected from 2-acrylamido-2-methylpropane sulfonic acid, 2-methacrylamido-2-methylpropane sulfonic acid, salts of said acids, and mixtures thereof, (c) 5 to 30% of primary copolymerizable comonomer selected from styrene sulfonic acid, salts of such acids, and mixtures thereof, and (d) up to 20% by weight of one or more secondary copolymerizable monomers which do not deleteriously affect performance of said copolymer, said secondary copolymerizable monomers exclude substituted acrylamides, vinyl esters, and vinyl acetate; said copolymer has weight average molecular weight in the range of about 1,000 to 100,000 and said metal ions are selected from iron, manganese, zinc, and mixtures thereof.

2. Method of claim 1 wherein amount of said copolymer is 1 to 50 ppm and its molecular weight is in the range of about 2,000 to 50,000.

3. Method of claim 2 wherein said aqueous medium is alkaline and is selected from process water used in steam generating systems, recirculating cooling water systems, gas scrubbing systems, desalination water systems, and crude petroleum recovery systems.

4. Method of claim 1 wherein amount of said secondary monomer is up to 10% by weight and molecular weight of said copolymer is about 2,000 to 20,000.

5. Method of claim 1 wherein said copolymer has molecular weight of about 2,000 to 20,000 and is selected from the following copolymers:

(a) 40 to 70% acrylic acid, methacrylic acid, or mixtures thereof;

(b) 20 to 50% 2-acrylamido-2-methylpropane sulfonic acid;

(c) 10 to 20% styrene sulfonic acid or its salt, and mixtures thereof; and (d) up to 10% of one or more other copolymerizable monomers.

6. Method of claim 5 wherein in said copolymer, said styrene sulfonic acids and salts thereof are defined as follows:

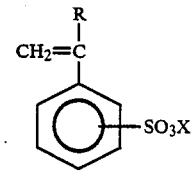

where R is selected from hydrogen and alkyl groups of 1 to 6 carbon atoms, and X is selected from hydrogen, alkali metals, alkaline earth metals, ammonium groups, and mixtures thereof.

7. Method of claim 6 wherein in the formula, R is selected from hydrogen and alkyl groups of 1 to 2 carbon atoms.

8. Method of claim 7 wherein said aqueous medium contains calcium scale selected from calcium phosphate, calcium sulfate, calcium carbonate, and mixtures thereof; and wherein amount of said metal ions is up to 10 ppm in said aqueous medium.

9. Method of claim 6 wherein in the formula, R is hydrogen and the —SO$_3$X group is at the 3 or 4 position on the phenyl ring.

10. Method of claim 1 wherein said copolymer is selected from the following copolymers, given in weight parts:

(a) 70:10:20 copolymer of AA:AMPS:SSS
(b) 60:10:30 copolymer of AA:AMPS:SSS
(c) 60:30:10 copolymer of AA:AMPS:SSS
(d) 60:32.5:7.5 copolymer of AA:AMPS:SSS
(e) 50:30:20 copolymer of AA:AMPS:SSS
(f) 40:30:30 copolymer of AA:AMPS:SSS
(g) 40:50:10 copolymer of AA:AMPS:SSS
(h) 60:25:10:5 copolymer of

AA:AMPS:SS:DADMAC wherein the contractions are defined as follows:
AA = acrylic acid
AMPS = 2-acrylamido-2-methylpropane sulfonic acid.
SSS = sodium styrene sulfonate
DADMAC = diallyldimethylammonium chloride.

11. Method of claim 1 wherein said aqueous medium contains up to 10 ppm of iron ions.

12. A method for maintaining metal ions in solution in an aqueous medium containing calcium and phosphate comprising adding to said aqueous medium an effective amount of a water-soluble copolymer for the purpose of maintaining said metal ions in solution, said copolymer consisting essentially of (a) 40-70% by weight carboxylic monomer selected from acrylic acid, methacrylic acid, salts of such acids, and mixtures thereof, (b) 10 to 50% by weight of a sulfonic monomer selected from 2-acrylamido-2-methylpropane sulfonic acid, 2-methacrylamido-2-methylpropane sulfonic acid, salts of said acids, and mixtures thereof, (c) 5 to 30% of primary copolymerizable comonomer selected from styrene sulfonic acid, salts of such acids, and mixtures thereof, and (d) up to 20% by weight of one or more secondary copolymerizable monomers which do not deleteriously affect performance of said copolymer, said secondary copolymerizable monomers exclude substituted acrylamides, vinyl esters, and vinyl acetate; said copolymer has weight average molecular weight in the range of about 1,000 to 100,000 and said metal ions are selected from iron, manganese, zinc, and mixtures thereof.

13. Method of claim 12 wherein amount of said copolymer is 1 to 50 ppm and its molecular weight is in the range of about 2,000 to 50,000.

14. Method of claim 13 wherein amount of said secondary monomer is up to 10% by weight and molecular weight of said copolymer is about 2,000 to 20,000.

15. Method of claim 13 wherein said aqueous medium is alkaline and is selected from process water used in steam generating systems, recirculating cooling water systems, gas scrubbing systems, desalination water systems, and crude petroleum recovery systems.

16. Method of claim 15 wherein said copolymer is selected from the following copolymers, given in weight parts:
  (a) 70:10:20 copolymer of AA:AMPS:SSS
  (b) 60:10:30 copolymer of AA:AMPS:SSS
  (c) 60:30:10 copolymer of AA:AMPS:SSS
  (d) 60:32.5:7.5 copolymer of AA:AMPS:SSS
  (e) 50:30:20 copolymer of AA:AMPS:SSS
  (f) 40:30:30 copolymer of AA:AMPS:SSS
  (g) 40:50:10 copolymer of AA:AMPS:SSS
  (h) 60:25:10:5 copolymer of

AA:AMPS:SSS:DADMAC wherein the contractions are defined as follows:
AA=acrylic acid
AMPS=2-acrylamido-2-methylpropane sulfonic acid.
SSS=sodium styrene sulfonate
DADMAC=diallyldimethylammonium chloride.

17. Method of claim 12 wherein said copolymer has molecular weight of about 2,000 to 20,000 and is selected from the following copolymers:
  (a) 40 to 70% acrylic acid, methacrylic acid, or mixtures thereof;
  (b) 20 to 50% 2-acrylamido-2-methylpropane sulfonic acid;
  (c) 10 to 20% styrene sulfonic acid or its salts, and mixtures thereof; and
  (d) up to 10% of one or more other copolymerizable monomers.

18. Method of claim 17 in said copolymer, said styrene sulfonic acids and salts thereof are defined as follows:

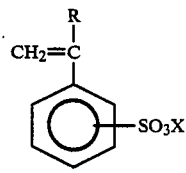

where R is selected from hydrogen and alkyl groups of 1 to 6 carbon atoms, and X is selected from hydrogen, alkali metals, alkaline earth metals, ammonium groups, and mixtures thereof.

19. Method of claim 18 wherein in the formula, R is selected from hydrogen and alkyl groups of 1 to 2 carbon atoms.

20. Method of claim 19 wherein said aqueous medium contains calcium scale selected from calcium phosphate, calcium sulfate, calcium carbonate, and mixtures thereof; and wherein amount of said metal ions is up to 10 ppm in said aqueous medium.

21. Method of claim 18 wherein in the formula, R is hydrogen and the —$SO_3X$ group is at the 3 or 4 position on the phenyl ring.

22. Method of claim 12 wherein said aqueous medium contains up to 10 ppm of iron ions.